May 7, 1940.   W. A. PAULSON   2,199,416
THERMOSTATIC CONTROL DEVICE
Filed June 14, 1938   2 Sheets-Sheet 1
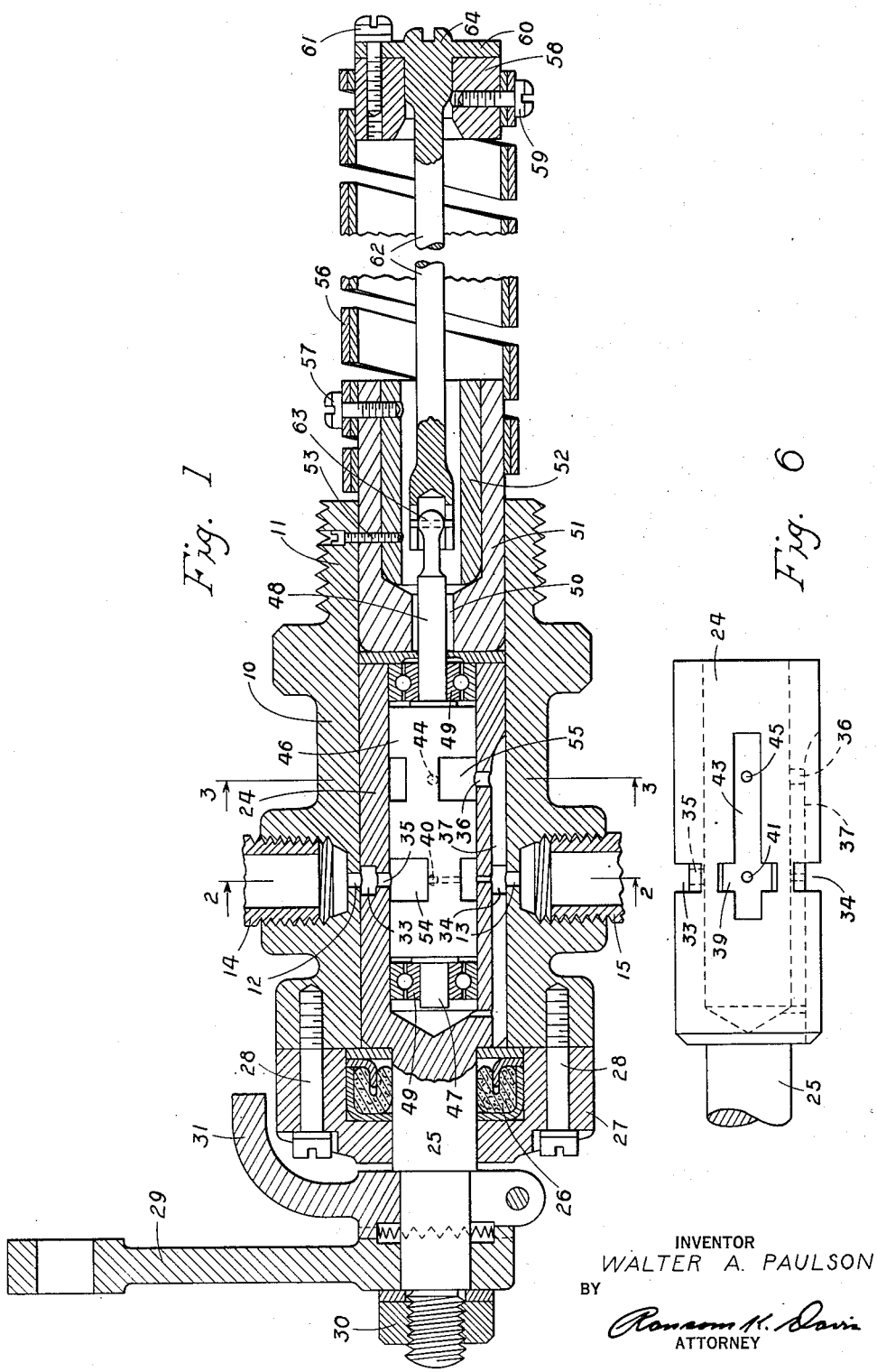
INVENTOR
WALTER A. PAULSON
BY
Ransom K. Davis
ATTORNEY May 7, 1940.  W. A. PAULSON  2,199,416
THERMOSTATIC CONTROL DEVICE
Filed June 14, 1938  2 Sheets-Sheet 2
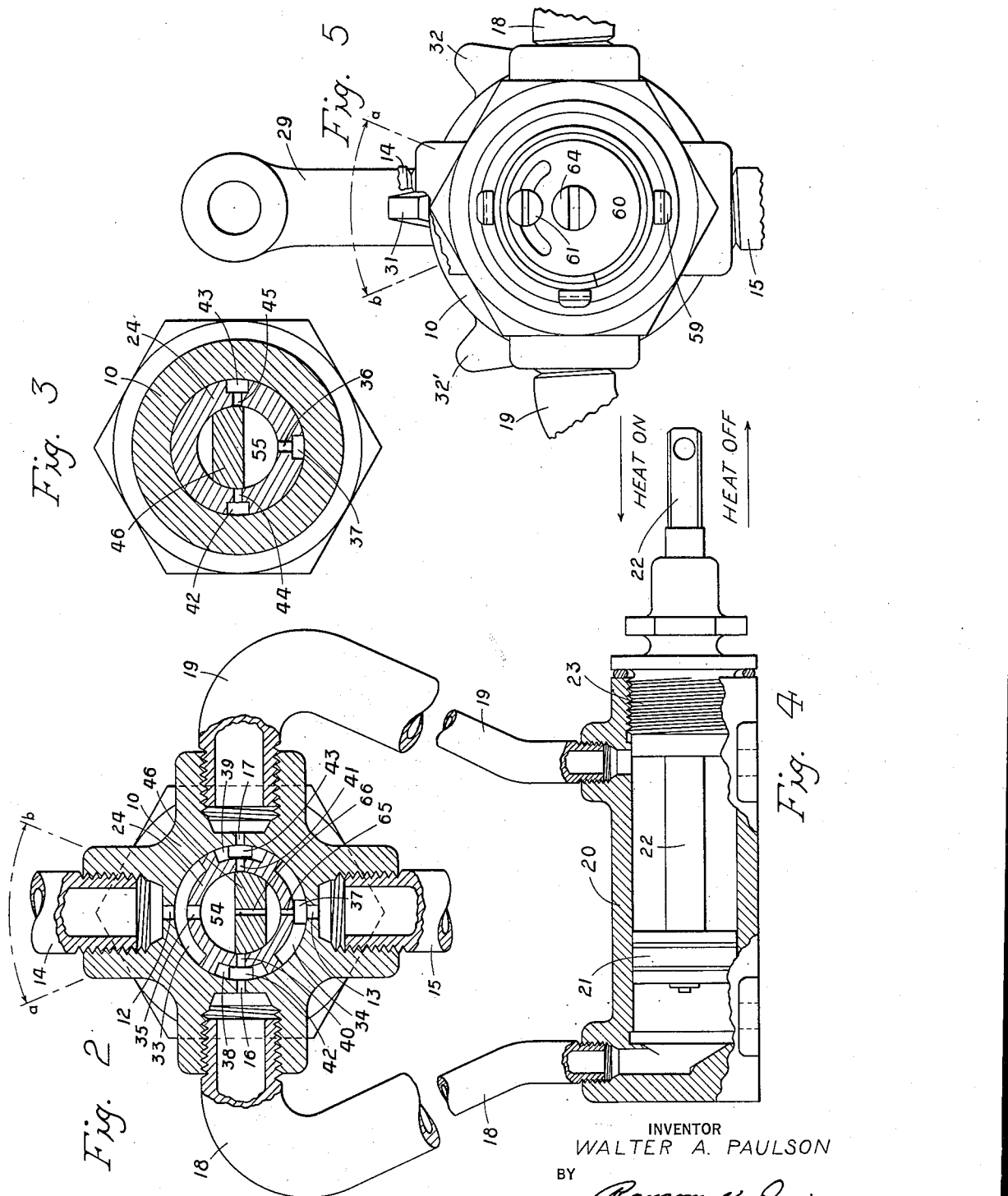
INVENTOR
WALTER A. PAULSON
BY
Ransom K. Davis
ATTORNEY Patented May 7, 1940

2,199,416

UNITED STATES PATENT OFFICE 2,199,416

THERMOSTATIC CONTROL DEVICE

Walter A. Paulson, Brooklawn, N. J.

Application June 14, 1938, Serial No. 213,579

4 Claims. (Cl. 121—46.5)

(Granted under the act of March 3, 1883, as amended April 30, 1928; 370 O. G. 757)

This invention relates to thermostatic control devices and it has a particular relation to devices for automatically controlling the temperature of air, fuel and other liquids, especially the air entering the carburetor of internal combustion engines and that employed for controlling the temperature of the cabins of aircraft or other motor vehicles.

One of the objects of the present invention is the provision of a new and improved thermostatic control device, of the character described, which is positive and accurate in its operation, which may be manually controlled if desired, to provide for a continuous heat-on or heat-off condition, and which may be operated from a remote point with a minimum of linkage overriding and lost motion.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a longitudinal sectional view through a thermostatically controlled valve constructed in accordance with the invention;

Fig. 2 is a transverse sectional view taken on line 2—2 of Fig. 1;

Fig. 3 is a similar view taken on line 3—3 of Fig. 1;

Fig. 4 is a longitudinal sectional view through a fluid pressure operated device or servo-cylinder controlled by the valve shown in Figs. 1 and 2;

Fig. 5 is an end elevational view of the structure shown in Fig. 1; and

Fig. 6 is a detail side elevational view of the selector sleeve member of the valve.

Referring to the drawings, a thermostatically controlled valve constructed in accordance with the present invention is shown as comprising a valve body 10 formed with a screw-threaded nipple 11 adapted to be threaded into any suitable support and having inlet and outlet openings 12 and 13, respectively, which communicate with pipes 14 and 15 leading to the high and low presssure sides of the oiling system of an internal combustion engine. The body 10 is also provided with openings 16 and 17 which communicate with pipes 18 and 19 leading to a fluid pressure cylinder 20 on opposite sides of a piston 21 therein. This piston actuates a rod 22 which extends through a gland 23 and operates, through suitable mechanism, an electric switch, butterfly valve located in an intake or exhaust manifold or other heating device.

Rotatably mounted within the body 10 is a selector sleeve 24 formed with a stem 25 which extends through a gland 26 located in a cap 27 secured to one end of the body 10 by screws 28. The sleeve 24 is normally stationary but may at times be rotated manually to obtain heat-on or heat-off conditions, as will presently be described, by means of a lever 29 which is fixed to the outer end of the stem 25 by a nut 30 and which may be operated from a remote point by suitable linkage mechanism, not shown. The movement of the lever 29 and that of the selector sleeve 24 is limited by means of an arm 31 adjustably secured to the stem 25 for abutting engagement with limit stops or lugs 32 and 32' formed on the valve cap 27 (Fig. 5). The sleeve 24 is formed with upper and lower arcuate grooves 33 and 34 which at all times register with the inlet and outlet openings 12 and 13. The groove 33 communicates with the interior of the sleeve 24 through a port 35 and the groove 34 communicates with the interior of the sleeve through a longitudinal channel 37 formed along the lower portion of the sleeve and a port 36. The sleeve 24 is also formed with two arcuate grooves 38 and 39 on its opposite sides which communicate with the interior of the sleeve through ports 40 and 41. Longitudinal channels 42 and 43 are also provided in the sides of the sleeve 24 and communicate with ports 44 and 45 extending through the sleeve 24 (Fig. 3).

Rotatably mounted within the sleeve 24 is an automatically operated valve member 46 provided at one end with a stud 47 and at its other end with a stem 48, each being journalled in bearings 49. The stem 48 extends through an opening 50 in a fibre bushing 51 which is mounted in the screw-threaded end 11 of the body 10 and through a metallic sleeve 52 disposed in the outer end of the bushing 51, the parts being secured against displacement by a screw 53. The valve member 46 is formed with upper and lower longitudinally spaced inlet and outlet notches or recesses 54 and 55, respectively. The notch 54 at all times communicates with the inlet port 35 in the sleeve 24 and at times registers with one or the other of the ports 40 and 41 and the notch 55 at all times communicates with the outlet port 36 and at times registers with one or the other of the ports 44 and 45, in a manner presently to be described.

The valve member 46 is rotated in order to cause the proper registry of the several ports, notches and channels, in accordance with fluctuations in temperature by a helically wound bi-metallic thermo-responsive element 56, one end of which is secured to the outer end of bushing 51 by a screw 57. A bushing 58 is secured in the other end of the member 56 by a screw 59 and carries a plate 60 which is mounted for rotary adjustment thereon by means of a slot and screw connection 61. A rod 62 extends coaxially through the member 56 and bushing 58 and is connected at its outer end to the plate 60 and at its inner end to the valve stem 48 by means of a flexible connection 63. The plate 60 is preferably formed with a slotted head 64 so as to enable necessary adjustments to be made with a screw driver.

From the foregoing it will be seen that with an increase in temperature the bi-metallic thermo-responsive element 56 will rotate the valve member 46 in a counterclockwise direction, as viewed in Fig. 2, so as to establish communication between the recesses 54 and 55 and the ports 40 and 45. This will permit oil from the high pressure side of the oiling system to flow through the pipe 14, port 12, groove 33, port 35, recess 54, port 40, groove 38, port 16 and pipe 18 into the left-hand end of the servo-cylinder 20, thus forcing the piston 21 and rod 22 to the right to actuate the proper instrumentalities to reduce the temperature. The oil displaced from the right-hand end of the cylinder during this movement of the piston will flow through the pipe 19, port 17, groove 39, channel 43, port 45, recess 55, port 36, channel 37, port 13 and pipe 15 into the low pressure side of the oiling system. Conversely, if the temperature of the environment decreases, the bi-metallic element 56 will rotate the valve member 46 in a clockwise direction, as viewed in Fig. 2, thereby interrupting communication between the recesses 54 and 55 and the ports 40 and 45, respectively, and establishing communication between these recesses and the ports 41 and 44, respectively. This will permit high pressure oil to flow from the recess 54 through port 41, groove 39, port 17 and pipe 19 into the right-hand end of the servo-cylinder 20, thus forcing the piston 21 and rod 22 to the left so as to operate the temperature control instrumentalities to increase the temperature. The oil displaced from the left-hand end of the cylinder 20 will flow through the pipe 18, port 16, groove 38, channel 42, port 44, recess 55, port 36, channel 37, port 13 and pipe 15 into the low pressure side of the oiling system.

The sleeve 24 and valve member 46 are also provided with by-pass ports 65 and 66 to permit a small quantity of oil to pass from the high pressure port 35 directly to the low pressure port 13 at all times so as to eliminate the possibility of a stagnant condition of cold oil.

If it should be desired to dispense with the automatic operation of the valve, and to entirely cut off the supply of heat, the lever 29 is moved to the right, as viewed in Fig. 5, until its movement is arrested by the arm 31 engaging the stop 32. This will rotate the selector sleeve 24 in a counterclockwise direction, as viewed in Fig. 2, and carry the groove 33 therein into registry with the port 16 and the port 40 therein out of registry therewith. This movement of the selector sleeve 24 also carries the groove 34 into registry with the outlet ports 13 and 17, the grooves 33 and 34 being of sufficient length to establish direct communication between the ports 12 and 16 and the ports 13 and 17. It will be seen that the manual operation of the selector sleeve 24, as above described, will rotate this sleeve out of the range of automatic operation of the valve member 46. Pressure will thus be maintained within the left-hand end of the servo-cylinder until the selector sleeve 24 is returned to the intermediate position, hereinbefore described, for automatic operation. If, on the other hand, it is desired to maintain the heat on continuously to the exclusion of the automatic operation of the valve, the lever 29 is moved to its extreme right-hand position, thus rotating the selector cylinder in a clockwise direction and carrying the groove 33 into registry with both the ports 12 and 17. This will supply oil under pressure continuously to the right-hand end of the servo-cylinder 20 so as to shift the piston 21 and rod 22 to the left and to hold them in such position. This will actuate the temperature control mechanism to maintain a full heat-on condition.

Between the two extreme positions, hereinabove described, the selector sleeve 24 may be rotated between the intermediate limits indicated by the broken lines a—b in Fig. 2, permitting a selection of the automatically controlled temperature by changing the positions of the ports 40, 41, 44 and 45 relative to the angular position of the bi-metallic thermo-responsive element 56 and valve member 46. That is to say, by rotating the selector sleeve manually, the ports therein can be advanced or retarded with respect to the valve member 46 so that the latter will have to rotate a greater or less distance in establishing communication therewith. This will necessitate a greater or less movement of the bi-metallic element with changes in temperature.

It will be understood that the above-description and accompanying drawings comprehend only the general and preferred embodiment of the invention, and that various other changes in the construction, proportion and arrangement of the parts may be made by those skilled in the art without departing from the nature and scope of the invention as defined in the appended claims.

The invention described herein may be manufactured and/or used by or for the Government of the United States of America for governmental purposes without the payment of any royalties thereon or therefor.

I claim:

1. A thermostatic control device comprising a valve body having high and low pressure openings therein adapted to be communicably connected with the high and low pressure sides of a source of fluid pressure, and a pair of openings adapted to be communicably connected with a fluid pressure operated device; a valve member movably mounted in said valve body for establishing communication between said high and low pressure openings and selected openings of said pair of openings to operate said fluid pressure device in opposite directions; a thermo-responsive device for automatically moving said valve member with fluctuations in temperature; and manually operable means movable independently of said valve member for establishing direct communication between said high and low pressure openings and the selected openings of said pair of openings irrespective of the temperature and the resulting movement of said valve member.

2. A thermostatic control device comprising a valve body having high and low pressure openings therein adapted to be communicably connected with the high and low pressure sides of a source of fluid pressure, and a pair of openings adapted to be communicably connected with a fluid pressure operated device; a valve member movably mounted in said valve body for establishing communication between said high and low pressure openings and selected openings of said pair of openings to operate said fluid pressure device in opposite directions; a thermo-responsive device for automatically moving said valve member with fluctuations in temperature; and a sleeve surrounding said valve member and rotatable independently thereof to a position wherein it establishes direct communication between said high and low pressure openings and the selected openings of said pair of openings irrespective of the temperature and the resulting movement of said valve member.

3. A thermostatic control device comprising a valve body having high and low pressure openings therein adapted to be communicably connected with the high and low pressure sides of a source of fluid pressure, and a pair of openings adapted to be communicably connected with a fluid pressure operated device; a valve member rotatably mounted in said valve body for establishing communication between said high and low pressure openings and selected openings of said pair of openings to operate said fluid pressure device in opposite directions; a helically wound bi-metallic member carried by said valve body and connected with said valve member for automatically rotating the same with fluctuations in temperature; and a sleeve surrounding said valve member and rotatable relative thereto to a position wherein it establishes direct communication between said high and low pressure openings and the selected openings of said pair of openings irrespective of the temperature and the resulting movement of said valve member.

4. A thermostatic control device comprising a valve body having high and low pressure openings therein adapted to be communicably connected with the high and low pressure sides of a source of fluid pressure, and a pair of openings adapted to be communicably connected with a fluid pressure operated device; a valve member movably mounted in said valve body for establishing communication between said high and low pressure openings and selected openings of said pair of openings to operate said fluid pressure device in opposite directions; a thermo-responsive device for automatically moving said valve member with fluctuations in temperature; and manually operable means for advancing and retarding the temperature at which said valve member establishes communication between said high and low pressure openings and the selected openings of said pair of openings.

WALTER A. PAULSON.